(12) United States Patent
Bevirt et al.

(10) Patent No.: US 10,479,490 B2
(45) Date of Patent: Nov. 19, 2019

(54) MULTI-CONFIGURATION AUTONOMOUS PLATFORM WITH MOUNTED CAMERA

(71) Applicants: JoeBen Bevirt, Santa Cruz, CA (US); Andy Clark, Santa Cruz, CA (US)

(72) Inventors: JoeBen Bevirt, Santa Cruz, CA (US); Andy Clark, Santa Cruz, CA (US)

( * ) Notice: Subject to any disclaimer, the term of this patent is extended or adjusted under 35 U.S.C. 154(b) by 375 days.

(21) Appl. No.: 15/386,344

(22) Filed: Dec. 21, 2016

(65) Prior Publication Data
US 2017/0259914 A1 Sep. 14, 2017

Related U.S. Application Data

(60) Provisional application No. 62/270,567, filed on Dec. 21, 2015.

(51) Int. Cl.
| | |
|---|---|
| *B64C 27/52* | (2006.01) |
| *B64C 27/08* | (2006.01) |
| *B64C 39/02* | (2006.01) |
| *B64D 47/08* | (2006.01) |
| *B64D 27/24* | (2006.01) |
| *B64C 27/20* | (2006.01) |
| *B64C 27/50* | (2006.01) |
| *B64C 1/30* | (2006.01) |

(52) U.S. Cl.
CPC ............ *B64C 27/52* (2013.01); *B64C 1/30* (2013.01); *B64C 27/08* (2013.01); *B64C 27/20* (2013.01); *B64C 27/50* (2013.01); *B64C 39/024* (2013.01); *B64D 27/24* (2013.01); *B64D 47/08* (2013.01); *B64C 2201/024* (2013.01); *B64C 2201/027* (2013.01); *B64C 2201/042* (2013.01); *B64C 2201/108* (2013.01); *B64C 2201/127* (2013.01); *B64C 2201/141* (2013.01); *B64C 2201/162* (2013.01); *B64C 2201/165* (2013.01); *Y02T 50/62* (2013.01)

(58) Field of Classification Search
CPC ....... B64C 27/08; B64C 27/52; B64C 27/473; B64C 27/20; B64C 27/14
See application file for complete search history.

(56) References Cited

U.S. PATENT DOCUMENTS

| | | | | |
|---|---|---|---|---|
| 3,053,480 A | * | 9/1962 | Vanderlip | B64C 27/54 244/17.13 |
| 8,322,648 B2 | * | 12/2012 | Kroetsch | A63H 27/12 244/17.23 |
| D774,941 S | * | 12/2016 | Lupashin | D12/16.1 |
| 2015/0298788 A1 | * | 10/2015 | Wang | B64C 39/028 701/3 |

* cited by examiner

*Primary Examiner* — Justin M Benedik
(74) *Attorney, Agent, or Firm* — Michael A. Guth

(57) ABSTRACT

A system for video imaging and photographing using an autonomous aerial platform. The system may be a quad rotor system using electrically powered propellers. The aerial platform may be commanded by the user to follow an object of interest. The aerial platform may have multiple configurations for its thrust units such that they are clear of the field of view of the imaging device in a first configuration, such that they protect the imaging device during landing in a second configuration, and that allows for efficient storage in a stowed configuration.

9 Claims, 13 Drawing Sheets

MULTI-CONFIGURATION AUTONOMOUS PLATFORM WITH MOUNTED CAMERA

CROSS-REFERENCE TO RELATED APPLICATIONS

This application claims priority to U.S. Provisional Patent Application No. 62/270,567 to Bevirt et al., filed Dec. 21, 2015, which is hereby incorporated by reference in its entirety.

FIELD OF THE INVENTION

This invention relates to aerial vehicles, namely a system with an aerial platform adapted for tracking and video recording a moving target. The platform may have multiple configurations which allow for various modes of operation.

SUMMARY

Figure 1A:
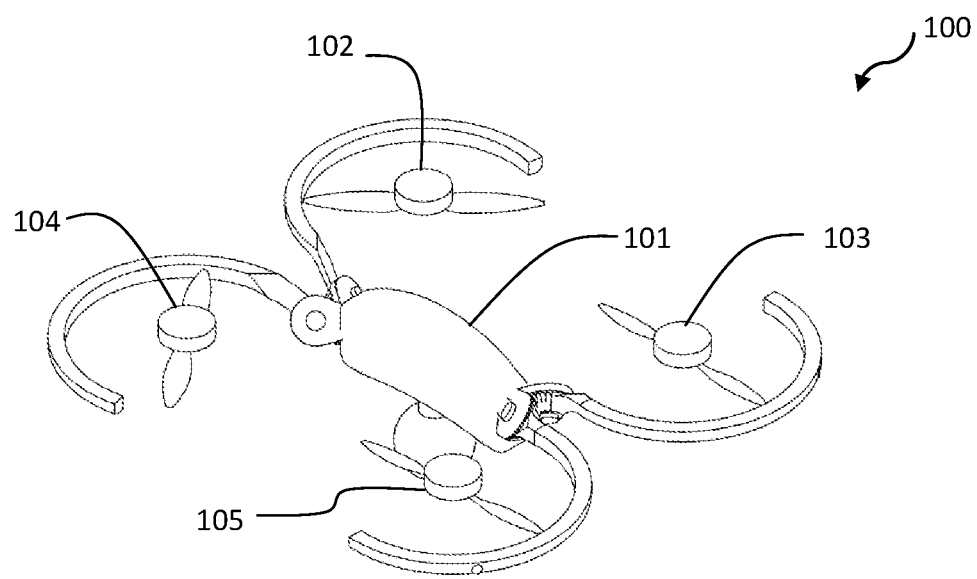
FIGS. 1A-F are views of an aerial platform in a nominal flight configuration according to some embodiments of the present invention.
Figure 1B:
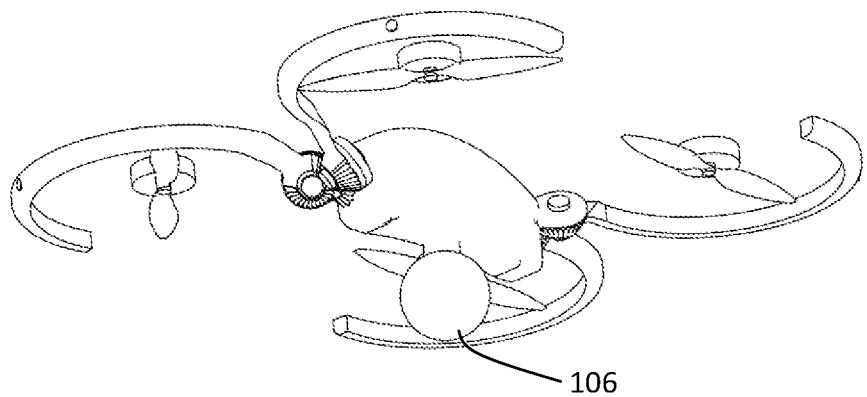
Figure 1C:
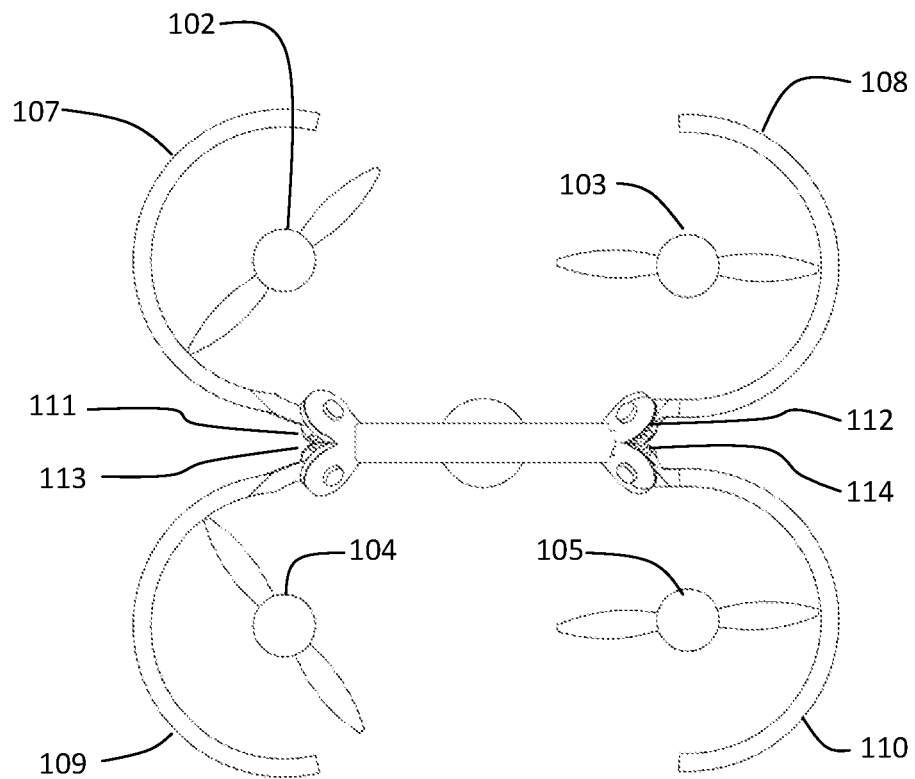
Figure 1D:
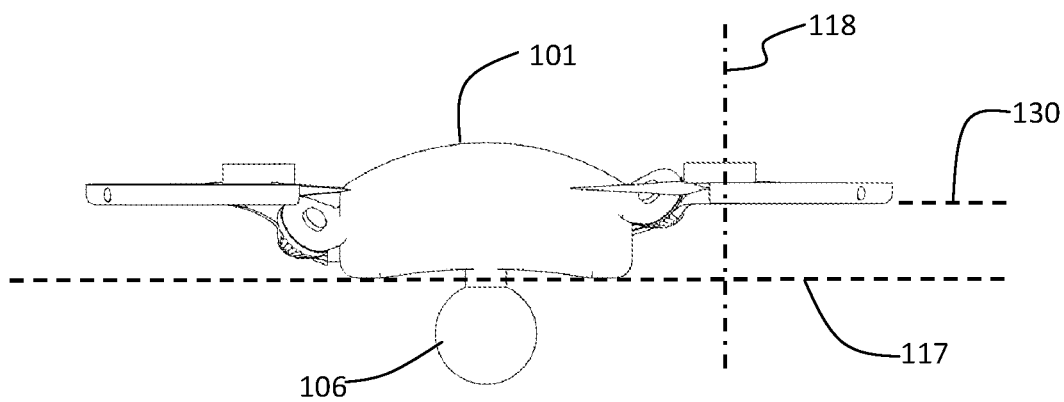

A system for video imaging and photographing using an autonomous aerial platform. The system may be a quad rotor system using electrically powered propellers. The aerial platform may be commanded by the user to follow an object of interest. The aerial platform may have multiple configurations for its thrust units such that they are clear of the field of view of the imaging device in a first configuration, such that they protect the imaging device during landing in a second configuration, and that allows for efficient storage in a stowed configuration.

DETAILED DESCRIPTION

In some embodiments of the present invention, the system is comprised of quad-rotor with movable support arms which allow for multiple configurations, which may be adjusted according to the mode of use desired by the user. A drawback of some current systems is that a camera suspended below an aerial vehicle, such as a quadrotor, may have its field of view impinged upon when taking images. This may occur because the chosen field of view is large, or because as part of the control of the aerial vehicle the attitude of the aerial vehicle results in a position in which a portion of the aerial vehicle has worked its way into the field of view.

Another drawback of some current systems is that a camera suspended below aerial vehicle is vulnerable to damage during landing of the aerial vehicle. Although some aerial vehicle systems may use legs which protrude below the aerial vehicle to function as landing pegs, a drawback with this approach is that these legs will interfere with the field of view of the camera.

Yet another drawback with current systems is that once the flight is completed, the aerial vehicle is large and bulky and may be difficult to transport.

In some embodiments of the present invention, as seen in FIGS. 1A-F, a flying system 100 utilizes an aerial platform 101. The aerial platform 101 may have a video camera adapted to record video of an object of interest. The aerial platform 101 may have a camera 106 adapted to take video and/or still images. Attached to the aerial platform 101 may be four thrust units 102, 103, 104, 105. The thrust units 102, 103, 104, 105 may be comprised of electric motors and propellers. The propellers may be protected by propeller guards 107, 108, 109, 110.

Figure 1E:
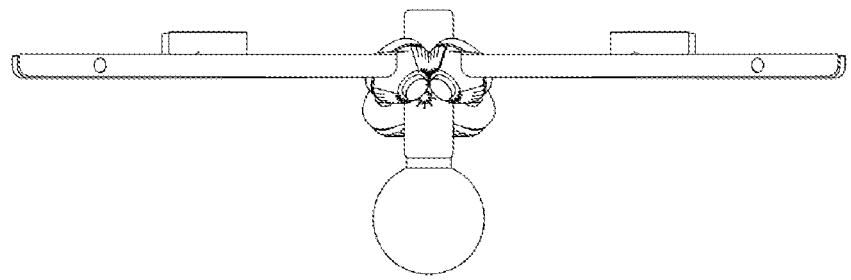
Figure 1F:
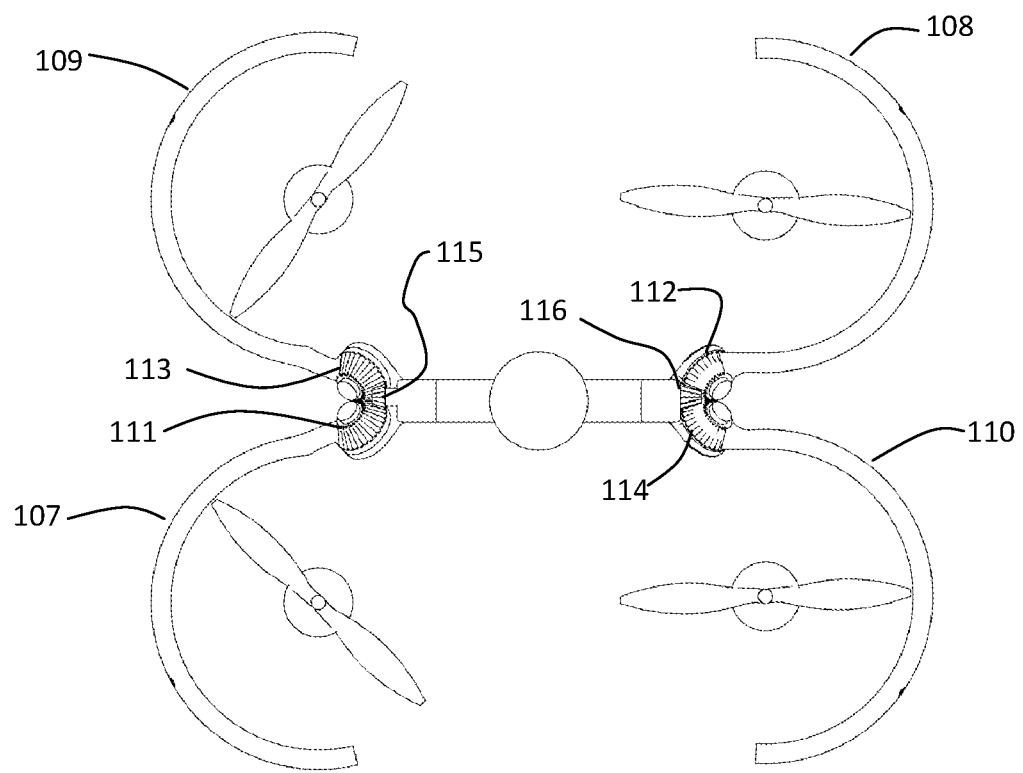

FIGS. 1E and 1F help illustrate an aspect allowing for multiple configurations of the thrust units and the guards according to some embodiments of the present invention. On a first end of the aerial platform, a first guard 107 is pivotally attached to the aerial platform. The attachment includes a gear 111, which is engaged to a gear 113 which is affixed to the second guard 109. This engagement allows the two guards to move in unison, pivoting out of the horizontal plane 130. A drive pinion 115 drives one of the gears, which in turn drives the other gear. On a second end of the aerial platform, a first guard 108 is pivotally attached to the aerial platform. The attachment includes a gear 112, which is engaged to a gear 114 which is affixed to the second guard 110. This engagement allows the two guards to move in unison, pivoting out of the horizontal plane 130. A drive pinion 116 drives one of the gears, which in turn drives the other gear. In some embodiments other actuation systems are used to drive position of the rotors. In some embodiments, the guards may be positioned by the user by hand, with the guards being held in position with a frictional fit. In some embodiments, the guards may be positioned by the user by hand and held in position by a position holding portion, such as indiced locks which snap into place in the closed and open configurations, for example.

Figure 2A:
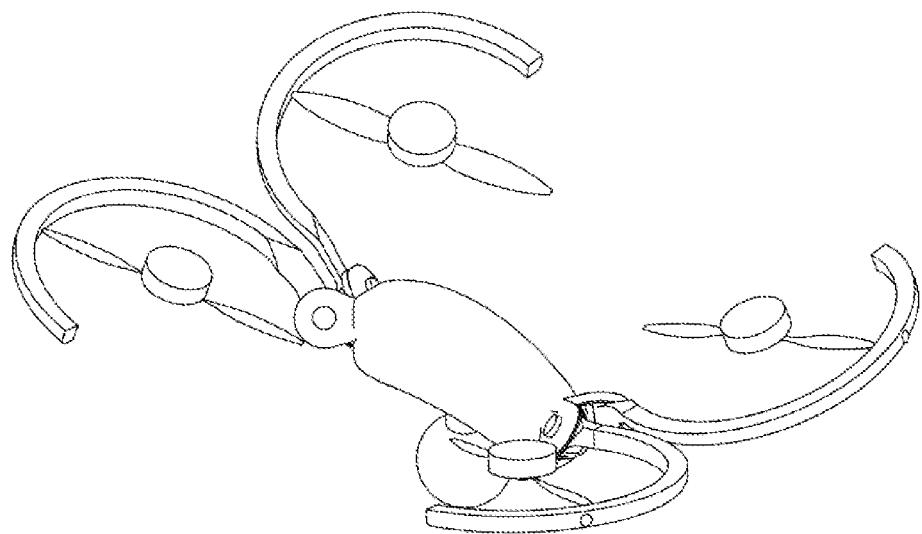
FIGS. 2A-F are views of an aerial platform in a raised, imaging, flight configuration according to some embodiments of the present invention.
Figure 2B:
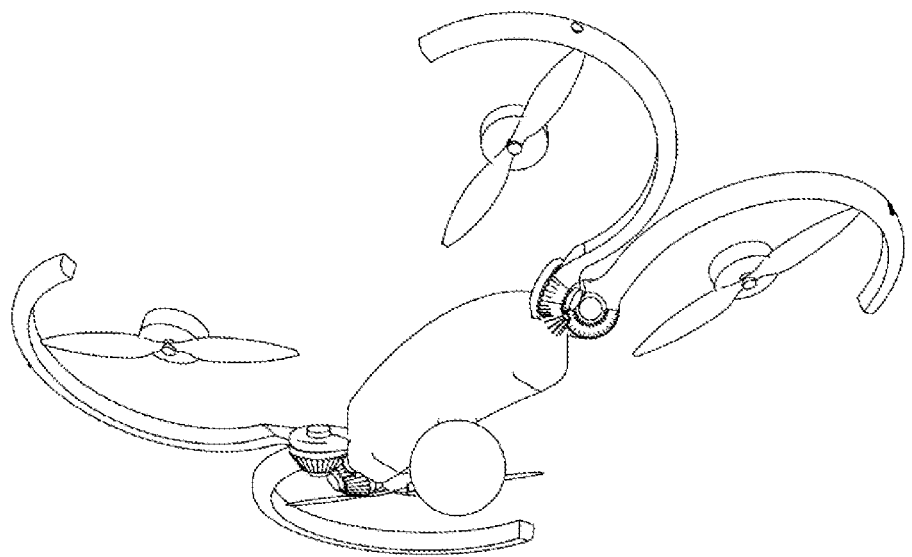
Figure 2C:
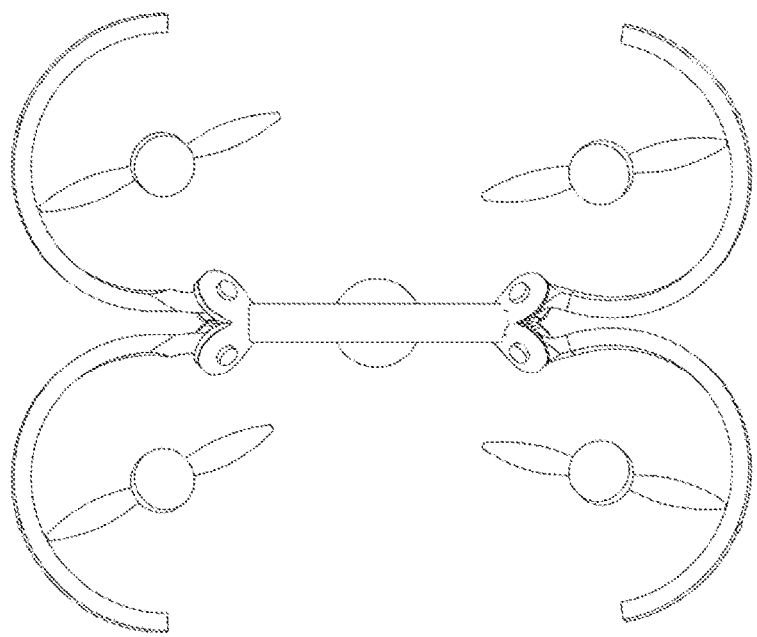
Figure 2D:
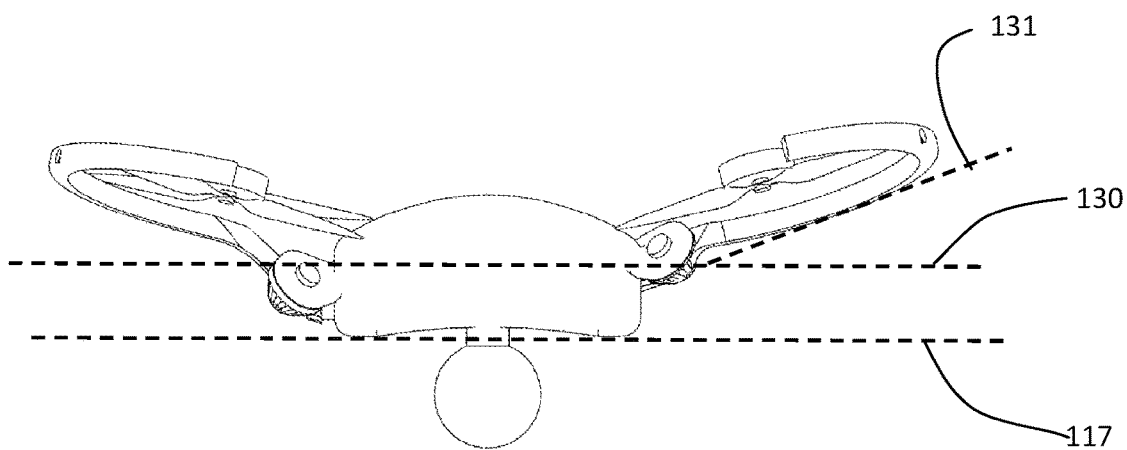
Figure 2E:
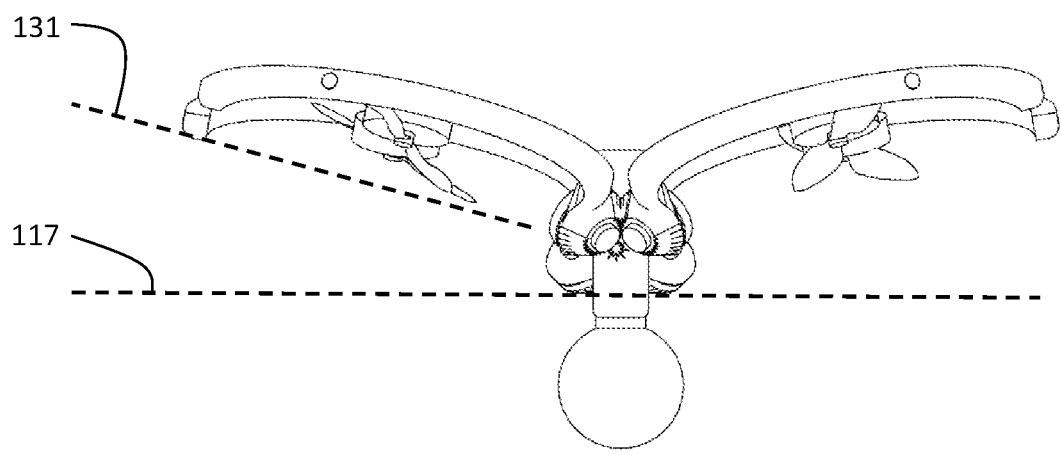
Figure 2F:
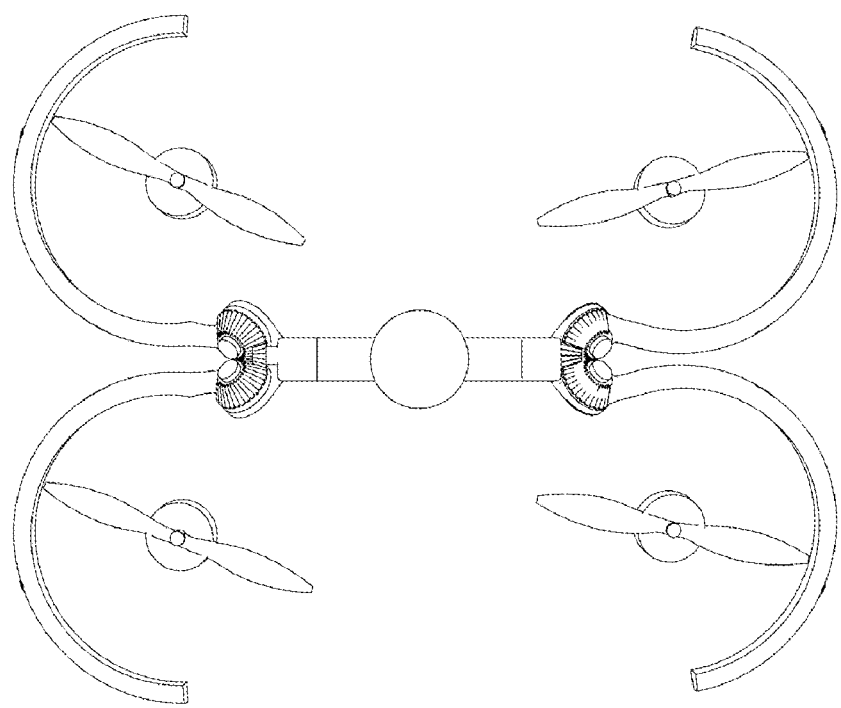

FIGS. 2A-F illustrate a second configuration of the system which is adapted to allow for a wider view angle of the camera without impingement of the field of view by the thrust units or guards. As seen in FIG. 2D, the thrust units and guards have been pivoted upwards at an angle 131 which raises the thrust units and guards above the nominal plane 130 of the nominal flight configuration. In some aspects, this configuration is commanded by a remote user. In some aspects, other aspects of the control of the aerial vehicle, with regard to thrust variation of the thrust units for attitudinal and positional control, for example, remain unchanged even with this change in configuration. This second configuration allows for enhanced fields of view of the imaging camera(s).

Figure 3A:
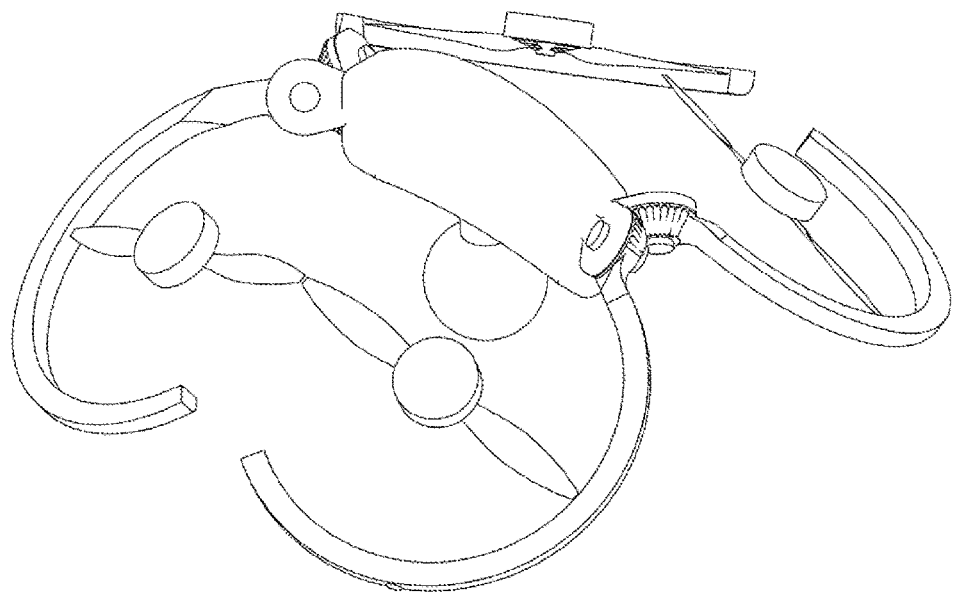
FIGS. 3A-E are views of an aerial platform in a lowered, landing, configuration according to some embodiments of the present invention.
Figure 3B:
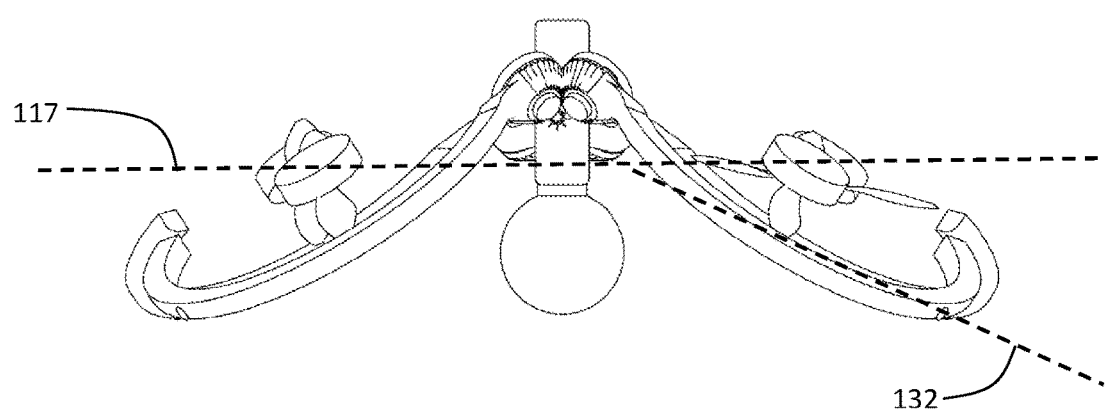
Figure 3C:
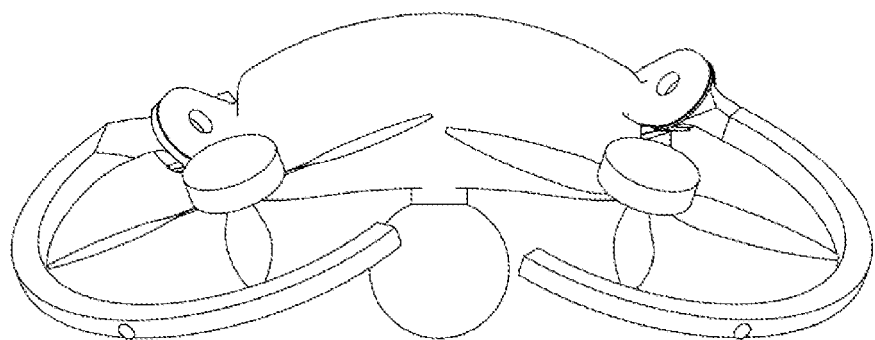
Figure 3D:
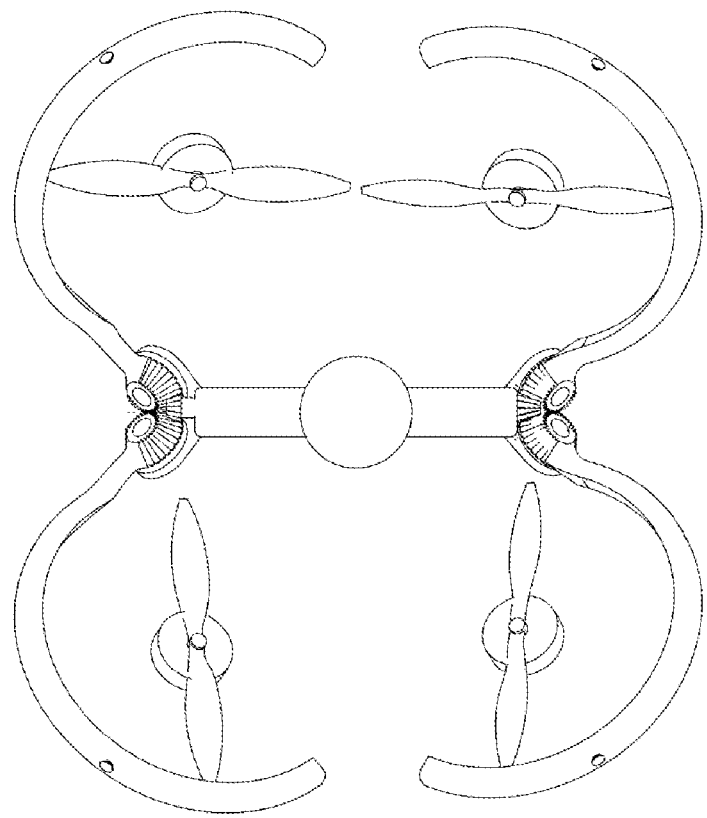
Figure 3E:
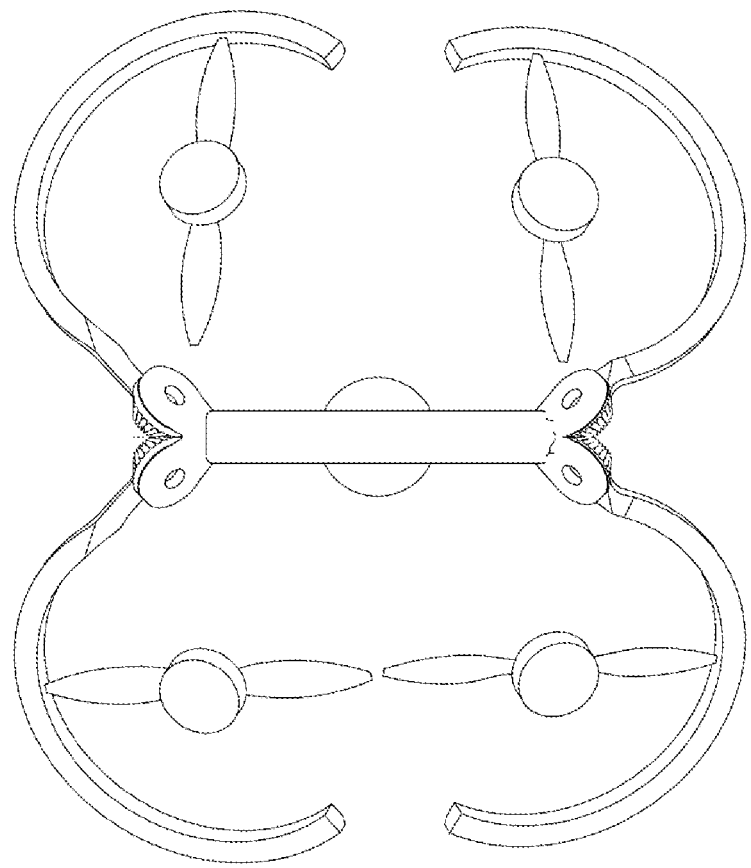
Figure 4A:
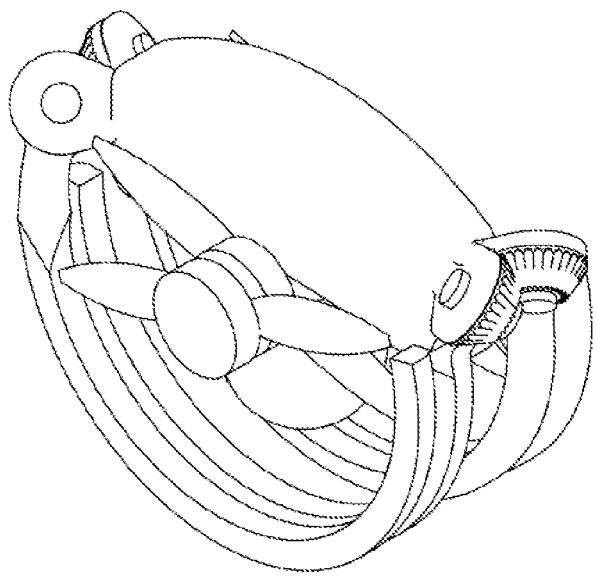
FIGS. 4A-E are views of an aerial platform in a stowed configuration according to some embodiments of the present invention.
Figure 4B:
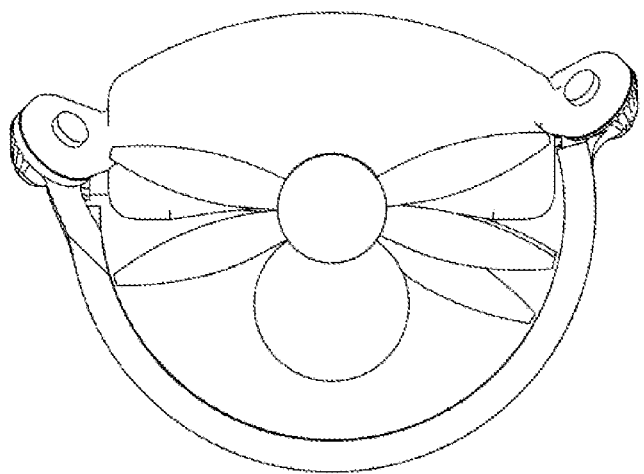
Figure 4C:
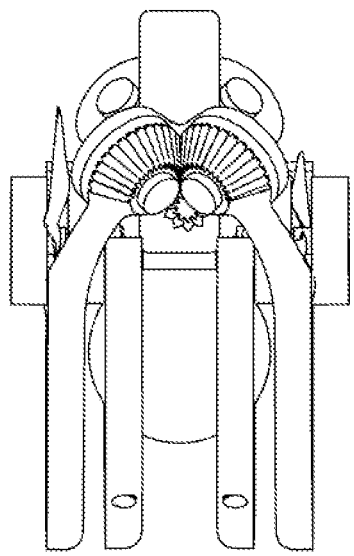
Figure 4D:
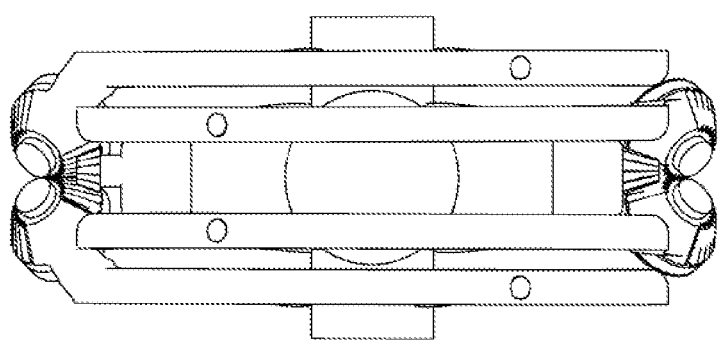
Figure 4E:
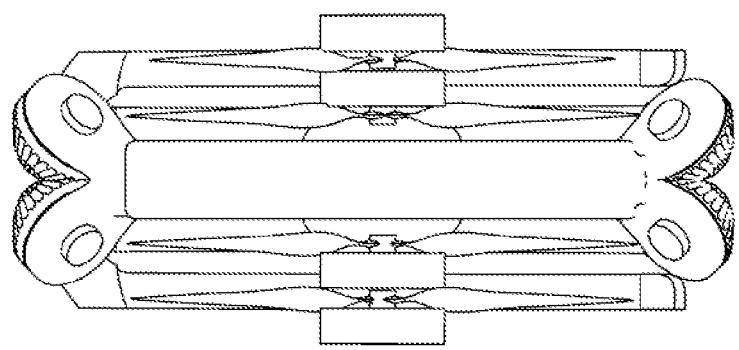

FIGS. 3A-E illustrate a third configuration of the system which is adapted for landing of the aerial vehicle. As seen in FIG. 3C, the thrust units and guards have been pivoted downwards at an angle 132 which lowers the thrust units and guards above the nominal plane 117 of the aerial vehicle in the nominal flight configuration. In some aspects, this configuration is commanded by a remote user. In some aspects, other aspects of the control of the aerial vehicle, with regard to thrust variation of the thrust units for attitudinal and positional control, for example, remain unchanged even with this change in configuration. This third configuration allow for landing of the aerial vehicle with reduced risk of damage to the camera(s).

FIGS. 4A-E illustrate a fourth configuration of the system. This stowed configuration is adapted to allow for an efficient packing factor of the system when not in use as a flying vehicle.

Figure 5:
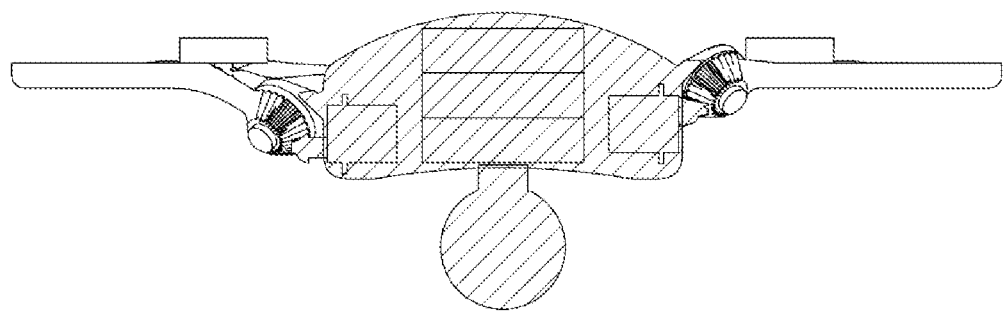
FIG. 5 is a partial cross-sectional view of an aerial platform according to some embodiments of the present invention.
Figure 6:
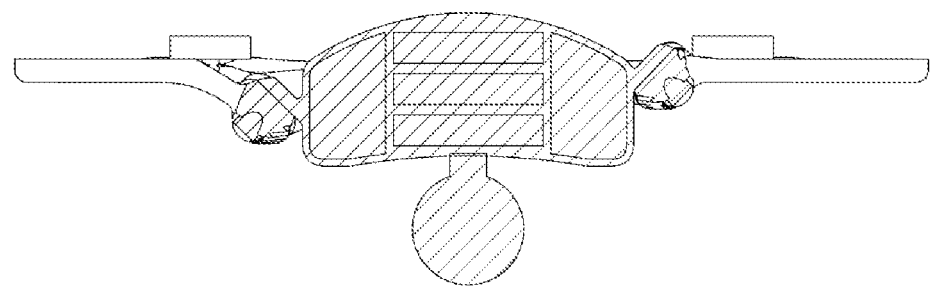
FIG. 6 is a partial cross-sectional view of an aerial platform according to some embodiments of the present invention.

FIGS. 5 and 6 illustrate exemplary views of internal packing of the system.

In some embodiments, the platform supports a video camera. In some embodiments, the video camera is supported with an articulated system adapted to allow for position control of the camera. Thus, when tracking a moving object on the ground, the flight path of the platform and the view angle of the camera may be independent, or quasi-independent.

In some embodiments, the system is adapted to allow the user to use an electronic device, which may be a handheld electronic controller, or a cellular telephone, to set up the operation of the aerial platform and the video camera mounted thereon. The handheld controller may be adapted to receive a signal from the camera such that the user may observe the image that is captured by the camera.

In some embodiments, the system is adapted to allow the user to select from a variety of operational modes. Among the modes available for selection may be nominal horizontal flight mode, enhanced imaging mode (with the thrust units and guards raised), and landing mode (with the thrust units and guards lowered).

In some embodiment, system operation may be facilitated using a specially designed graphical user interface on an advanced telephone, or a dedicated handheld control device. The handheld control device may transmit tracking assistance data to the aerial vehicle. This data may include position, velocity, acceleration, orientation, and heading. This information may be fused with sensor data on the vehicle.

In some embodiments, the user may command the aerial platform to lift off of the ground using the handheld controller, and then may view an image taken by the camera on the aerial platform. The user may then adjust the camera parameters, such as the zoom, while reviewing the change in view of the camera. The handheld controller may also allow for selection of a variety of parameters relating to a subsequent use of the system wherein the aerial platform tracks the user and records a video of the user. In some embodiments, the aerial platform may be programmed to safely land at either its current location, or at a pre-determined location, should the aerial platform or the camera lose track of the user for an extended period of time and/or when the battery charge has decreased below a certain threshold.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. A multi-configuration quad-rotor system, said multi-configuration quad-rotor system comprising:
   an aerial platform;
   a plurality of thrust units coupled to said aerial platform, wherein said thrust units are adapted to have a multitude of deployed configurations, wherein said thrust units comprise
   an electric motor;
   a propeller; and
   a propeller guard,
   wherein each of said thrust units deploy as a unit, and wherein each of said propeller guards is rotationally coupled to said aerial platform.

2. The multi-configuration quad-rotor system of claim 1 wherein said plurality of thrust units comprises four thrust units.

3. The multi-configuration quad rotor system of claim 2 wherein said aerial platform is adapted for regular flight in a first, horizontal, configuration parallel to a first horizontal plane along the bottom of said aerial platform.

4. The multi-configuration quad-rotor system of claim 3 further comprising an imaging device affixed to and underneath said aerial platform.

5. The multi-configuration quad-rotor system of claim 4 wherein said thrust units provide thrust perpendicular to said first horizontal plane while in said first configuration.

6. The multi-configuration quad-rotor system of claim 1 wherein said thrust units are adapted to pivot to a stowed configuration such that the structure of said thrust units pivots perpendicular to said first horizontal plane, thereby allowing for efficient packing of said multi-configuration quad-rotor system.

7. The multi-configuration quad-rotor system of claim 3 wherein said thrust units are adapted to pivot into a second configuration such that the structure of said thrust units pivots above said first horizontal plane, thereby minimizing impact onto view lines of said imaging device.

8. The multi-configuration quad-rotor system of claim 3 wherein said thrust units are adapted to pivot into a third configuration such that the structure of said thrust units pivots below said first horizontal plane, thereby protecting said imaging device during landing.

9. The multi-configuration quad-rotor system of claim 7 wherein said thrust units are adapted to pivot into a third configuration such that the structure of said thrust units pivots below said first horizontal plane, thereby protecting said imaging device during landing.

* * * * *